United States Patent [19]

Ruschmann

[11] Patent Number: 4,547,141
[45] Date of Patent: Oct. 15, 1985

[54] APPARATUS FOR EMBOSSING HOLOGRAMS ON METALIZED THERMOPLASTIC FILMS

[75] Inventor: Henry W. Ruschmann, Bernardsville, N.J.

[73] Assignee: Alpha Foils Inc., Bernardsville, N.J.

[21] Appl. No.: 627,782

[22] Filed: Jul. 5, 1984

[51] Int. Cl.⁴ .............................................. B29D 11/00
[52] U.S. Cl. ..................................... 425/374; 264/1.3;
    283/86; 350/3.61; 425/174.8 R; 425/385
[58] Field of Search .................. 264/1.3, 2.7; 425/374,
    425/385, 174.8 R; 264/106, 107, 284, 293;
    428/172; 283/72, 86; 350/3.61, 3.65

[56] References Cited

U.S. PATENT DOCUMENTS

| | | | |
|---|---|---|---|
| 3,535,413 | 10/1970 | Glenn, Jr. | 264/284 |
| 3,758,649 | 9/1973 | Frattarola | 264/1.3 |
| 3,882,207 | 5/1975 | Hannan et al. | 264/1.3 |
| 3,898,358 | 8/1975 | Ryan et al. | 350/3.61 |
| 3,945,790 | 3/1976 | Puech | 264/107 |
| 4,125,760 | 11/1978 | Nyfeler | 350/3.61 |
| 4,315,665 | 2/1982 | Haines | 350/3.61 |
| 4,407,861 | 10/1983 | Watanabe | 427/172 |

Primary Examiner—James Lowe
Attorney, Agent, or Firm—Kane, Dalsimer, Kane, Sullivan and Kurucz

[57] ABSTRACT

A method and apparatus is disclosed for embossing 2 and 3 dimensional holograms upon the metalized surface of a thermoplastic film.

1 Claim, 2 Drawing Figures

APPARATUS FOR EMBOSSING HOLOGRAMS ON METALIZED THERMOPLASTIC FILMS

BACKGROUND OF THE INVENTION

Field of the Invention

The invention relates to methods and apparatus for embossing 2 and 3 dimensional holograms on metalized thermoplastic films.

SUMMARY OF THE INVENTION

The invention comprises a method of embossing 2 and 3 dimensional holograms on the metalized surface of a thermoplastic resin film, which comprises;

providing an embossing die for transferring a hologram image to the metalized surface of a thermoplastic resin film, said die having a flat surface, said flat surface bearing a negative image of said hologram image;

placing a length of said film on the negative image with the metalized surface in contact with the negative image on the die surface; and forcing the metalized surface of the film against the negative image under sufficient heat and pressure to emboss a positive image corresponding to said negative image on the metalized surface without substantial degradation of said resin film.

The invention also comprises the apparatus of the invention, hereinafter described, for carrying out the method of the invention.

The method and the apparatus of the invention are advantageous for the production of undistorted holograms on metalized polymeric resin films in wide widths (circa 24 inches and more) at high production speeds.

DETAILED DESCRIPTION OF THE PREFERRED EMBODIMENTS OF THE INVENTION

Figure 1:
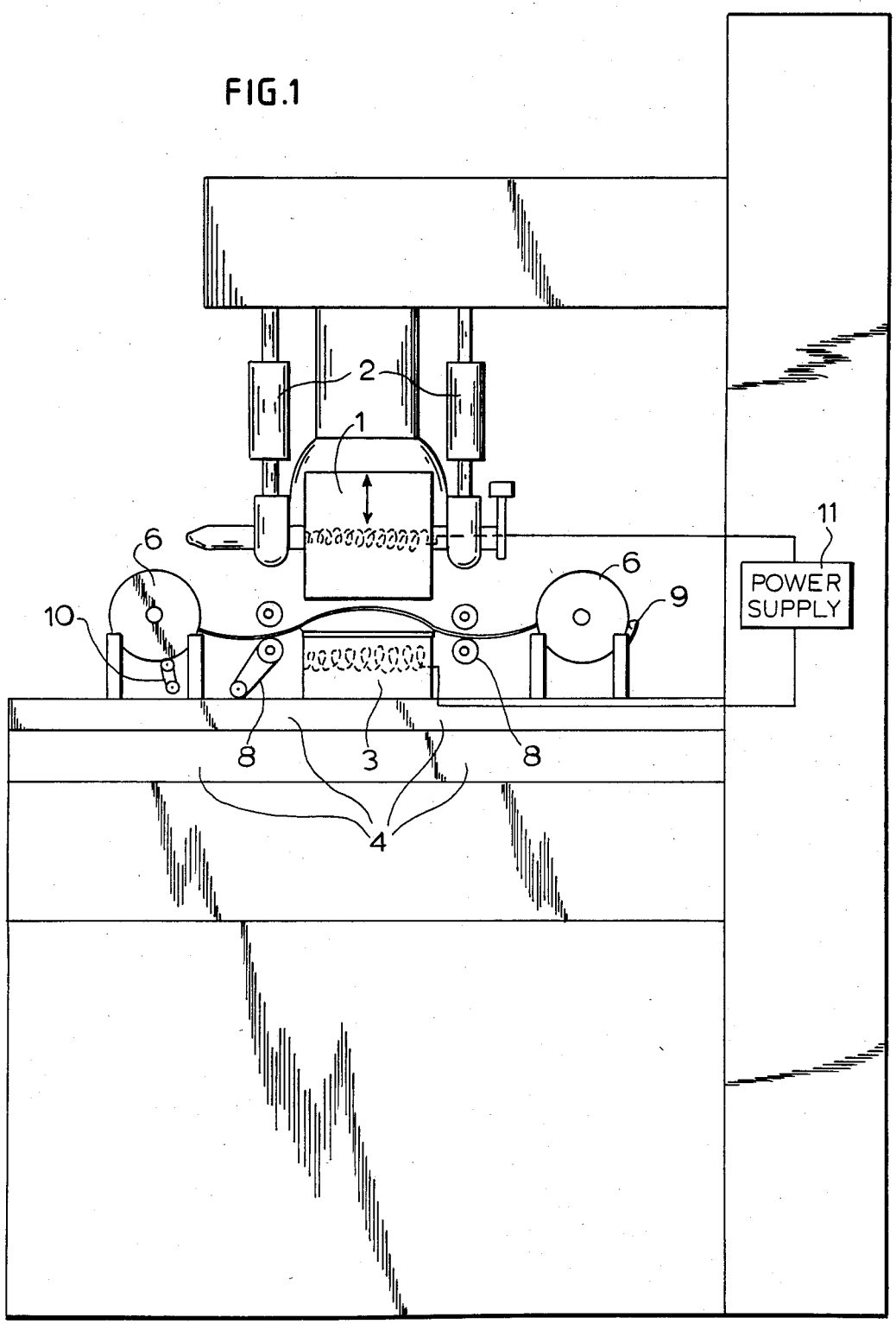
FIG. 1 is a side elevation of an embodiment apparatus of the invention.

Referring to FIG. 1, a side elevation of a preferred embodiment embossing apparatus of the invention is seen. The apparatus comprises a free-wheeling, hardened steel, polished surface, pressure roller 1 mounted on a stationary horizontal axis but vertically movable under the influence of two air rams 2. The roller 1 is advantageously heated by electrical induction means 11 to a temperature within the range of from 100° to 125° C. A flat surfaced, nickel plated die 3 is positioned beneath roller 1 and bears on the upper, flat surface thereof a negative hologram image. The die 3 is also advantageously heated by electrical means 11 to a temperature within the range of from 150° to 175° C.

The die 3 is fixedly mounted on a precision ground, steel reciprocating table 4. Preferably the table 4 is also heat controllable by electrical means 11 so as to assist raising ambient temperatures to the ranges specified above. The speed and length of travel of the table 4 so as to carry die 3 beneath roller 1 is preferably adjustable to accommodate the embossing of varied widths of metalized thermoplastic resin films, at various speeds. The table 4 reciprocates beneath roller 1 in the directions roller 1 can rotate, as shown by the arrows in FIG. 1, but on a fixed horizontal plane.

Figure 2:
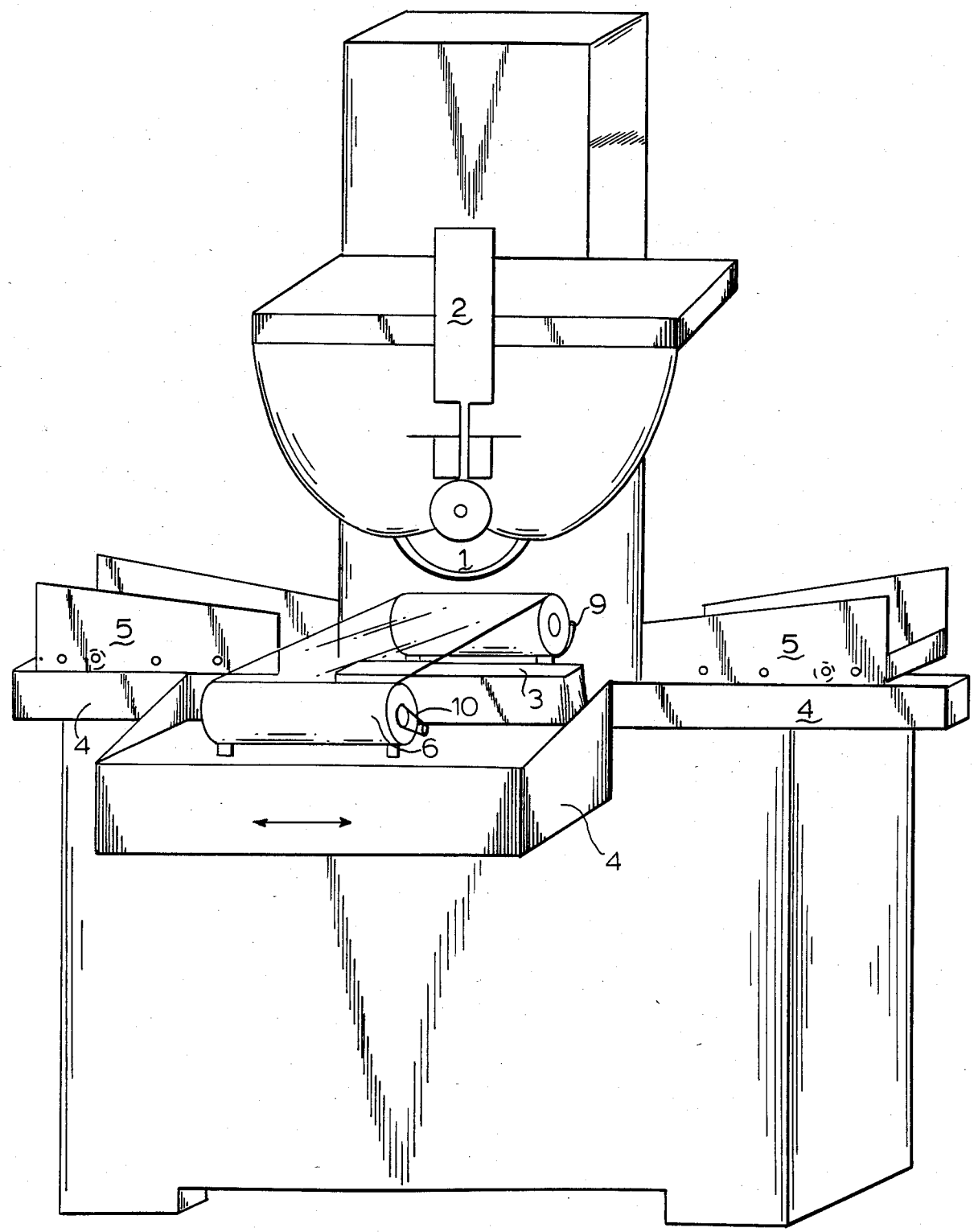
FIG. 2 is a view-in-perspective of the embodiment apparatus shown in FIG. 1.

Referring now to FIG. 2, a view-in-perspective of the apparatus shown in FIG. 1, the method of the invention will be described. A metalized, synthetic polymeric resin (thermoplastic) film 6 with metalized surface projecting downward is positioned over the negative hologram image on the flat, upper surface of the die 3. Any of the conventional films 6 may be used, as represented by metalized polyvinyl chloride films and, preferably, metalized polyester terephthalate films. The roller 1 and the die 3 are each heated to a temperature within the range of from 150° to 175° C., sufficient to aid embossing of the hologram image on the metalized film 6. The roller 1 is lowered to a height above die 3, such that an interposed film 6 will be pressed on the negative image under a pressure within the range of from 12,000 to 18,000 lbs/sq. inch, preferably 13,000 to 14,500. As table 4 is moved in a horizontal plane, it carries die 3 with the overlying film 6 into contact with the roller 1. The roller 1 rotates from frictional contact with the film 6 and impresses the film 6 against die 3 to carry out the embossing of the hologram on the metalized surface of the film 6. The movement of table 4 beneath the rotating roller 1 carries the die 3 with the interposed film 6 for a pressured stroke along the entire width of the die 3 to completely emboss the desired hologram image. At the end of the stroke, roller 1 will raise above table 4 on one of the two stationary cams 5 depending on the forward or rearward direction of the stroke. The cams 5 are mounted, one on each end of table 4 along the axis of table 4 movement. When roller 1 is cammed upward (approximately ⅛ inch) from contact with the film 6 on die 3, the embossed portion of film 6 may be advanced away from the face of the die 3 and a fresh portion of the film 6 positioned for embossing on the back stroke of the table 4 beneath the roller 1. At completion of the back stroke, the roller 1 is cammed upward by the second cam 5 on the opposite end of table 4. In this manner, an embossing takes place upon each reciprocation of the table 4 beneath roller 1, the film 6 being advanced between each reciprocation by film 6 feed rollers 8 (see FIG. 1). Each advance of the film 6 is for a distance and speed controlled by a solenoid controlled gear motor 7 to present a fresh length of film 6 for embossing at each reciprocation of table 4. An unwind brake 9 controls tension of the advancing film 6 and a re-wind slip clutch 10 provides for a smooth rewind of the embossed film 6.

What is claimed:

1. Apparatus for embossing a hologram image upon the metalized surface of a thermoplastic film, which comprises;

a free-wheeling pressure roller mounted to move vertically on a stationary horizontal axis;

a table, mounted to reciprocate in a forward and rearward line parallel to said horizontal axis;

a die having a flat surface bearing a negative hologram image corresponding to said hologram image, mounted on the table so that upon forward and rearward reciprocation of the table, the die is carried beneath the roller;

means to intermittently interpose a metalized thermoplastic film in pressured contact between the die and the roller;

means associated with the die and the roller for heating the interposed film; and means for reciprocating the table forward and backward so as to carry the interposed film in and out of pressured contact with the roller and the die whereby embossing occurs.

* * * * *